(12) United States Patent
Saeki et al.

(10) Patent No.: US 7,559,844 B2
(45) Date of Patent: Jul. 14, 2009

(54) TORQUE FLUCTUATION ABSORBER

(75) Inventors: Tomohiro Saeki, Anjo (JP); Satoshi Nakagaito, Kariya (JP); Makoto Takeuchi, Obu (JP); Masanori Suzuki, Obu (JP); Masaru Ebata, Chita (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 370 days.

(21) Appl. No.: 11/701,508

(22) Filed: Feb. 2, 2007

(65) Prior Publication Data
US 2007/0191120 A1   Aug. 16, 2007

(30) Foreign Application Priority Data
Feb. 16, 2006  (JP) ............................. 2006-039183

(51) Int. Cl.
*F16F 15/139* (2006.01)
*F16D 3/14* (2006.01)
*F16D 47/02* (2006.01)
*F16D 69/00* (2006.01)

(52) U.S. Cl. ................................. 464/68.4; 192/213.31
(58) Field of Classification Search ................ 464/64.4, 464/68.41; 192/213.12, 213.22, 213.31, 192/214.1, 210.1
See application file for complete search history.

(56) References Cited

U.S. PATENT DOCUMENTS 4,924,990 A * 5/1990 Takeuchi ................ 192/213.22
6,582,312 B2 * 6/2003 Suzuki et al.

FOREIGN PATENT DOCUMENTS

JP     2002-013547 (A)     1/2002

* cited by examiner

*Primary Examiner*—Greg Binda
*Assistant Examiner*—Clifford J Louden
(74) *Attorney, Agent, or Firm*—Buchanan Ingersoll & Rooney PC

(57) ABSTRACT

A torque fluctuation absorber includes a disc fixed to a flywheel, a hub fixed to a transmission, first and second side plates fixed to the disc, a damper member, first and second control plates provided at axial both sides of the hub, the first and second control plates being riveted by a stopper pin, a first hysteresis mechanism including first and second low friction members and generating a small hysteresis, and a second hysteresis mechanism including first and second high friction members and generating a large hysteresis. The hub includes a flange portion having a through-hole into which the stopper pin is inserted. A relative rotational angle between the control plates and the hub is defined by a clearance formed between the through-hole and the hub. The first hysteresis mechanism is activated when the relative rotational angle is defined within the clearance.

21 Claims, 4 Drawing Sheets

Normal assembly

Wrong assembly

TORQUE FLUCTUATION ABSORBER

CROSS REFERENCE TO RELATED APPLICATIONS

This application is based on and claims priority under 35 U.S.C. § 119 to Japanese Patent Application No. 2006-039183, filed on Feb. 16, 2006, the entire content of which is incorporated herein by reference.

FIELD OF THE INVENTION

This invention generally relates to a torque fluctuation absorber provided between a drive source and a transmission for absorbing a torque fluctuation generated between the drive source and the transmission.

BACKGROUND

A known torque fluctuation absorber such as a damper is disclosed in JP2002-13547A. The damper for a hybrid drive apparatus disclosed includes a damper mechanism for absorbing a driving torque fluctuation of a flywheel fixed to a drive shaft of a drive source, and a limiter mechanism arranged on an outer circumferential side of the damper mechanism. The limiter mechanism is achieved by a direct or indirect (i.e. by means of a friction surface plate) pressure contact between the flywheel and a friction material fixed to the outer circumferential portion of the damper mechanism. When a fluctuation torque reaches a predetermined value (i.e. limit torque value), the damper mechanism is allowed to slip so that an excess torque is prevented from being input or transmitted to a transmission.

However, according to the aforementioned torque fluctuation absorber with the known limiter mechanism, a downsizing of the device is difficult for ensuring a required limit torque value. In addition, a great number of friction materials and high accuracy disc springs are required, which may lead to a high cost.

Thus, a need exists for a torque fluctuation absorber that can include an excess torque restriction mechanism in substitution for a limiter mechanism and that can achieve a downsizing and a low cost.

SUMMARY OF THE INVENTION

According to an aspect of the present invention, a torque fluctuation absorber includes a disc fixed to a flywheel to which a driving force is transmitted from a drive source, a hub arranged on a radially inner side of the disc and fixed to an input shaft of a transmission, first and second side plates fixed to the disc so as to sandwich the disc, a damper member accommodated in window portions of the first and second side plates and cut portions of the hub and absorbing torque fluctuations transmitted from the side plates to the hub, first and second control plates provided at axial both sides of the hub and arranged between the first and second side plates respectively, the first and second control plates being riveted by a stopper pin, a first hysteresis mechanism axially arranged between the first control plate and the hub and between the second control plate and the hub and including first and second low friction members, the first hysteresis mechanism generating a small hysteresis by biasing the first and second low friction members towards one of the control plates and the hub, and a second hysteresis mechanism axially arranged between the first control plate and the first side plate and between the second control plate and the second side plate and including first and second high friction members, the second hysteresis mechanism generating a large hysteresis greater than the hysteresis generated by the first hysteresis mechanism by biasing the first and second high friction members towards one of the side plates and the control plates. The hub includes a flange portion having a through-hole into which the stopper pin is inserted. A relative rotational angle between the control plates and the hub is defined by a clearance formed between the through-hole and the hub in a relative rotational direction of the hub and the control plates. The first hysteresis mechanism is activated when the relative rotational angle is defined within the clearance.

According to another aspect of the present invention, a torque fluctuation absorber includes a disc fixed to a flywheel to which a driving force is transmitted from a drive source, a hub arranged on a radially inner side of the disc and fixed to an input shaft of a transmission, a side plate fixed to the disc, a damper member accommodated in window portions of the first and second side plates and cut portions of the hub along a rotational direction thereof and absorbing torque fluctuations transmitted from the side plates to the hub, a control plate provided at axial one side of the hub and arranged between the side plate and the hub, the control plate being riveted by a stopper pin, a first hysteresis mechanism axially arranged between the control plate and the hub and including a low friction member, the first hysteresis mechanism generating a small hysteresis by biasing the low friction member towards one of the control plate and the hub, and a second hysteresis mechanism axially arranged between the control plate and the side plate and including a high friction member, the second hysteresis mechanism generating a large hysteresis greater than the hysteresis generated by the first hysteresis mechanism by biasing the high friction member towards one of the side plate and the control plate. The hub includes a flange portion having a through-hole into which the stopper pin is inserted. A relative rotational angle between the control plate and the hub is defined by a clearance formed between the through-hole and the hub in a relative rotational direction of the hub and the control plate. The first hysteresis mechanism is activated when the relative rotational angle is defined within the clearance.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
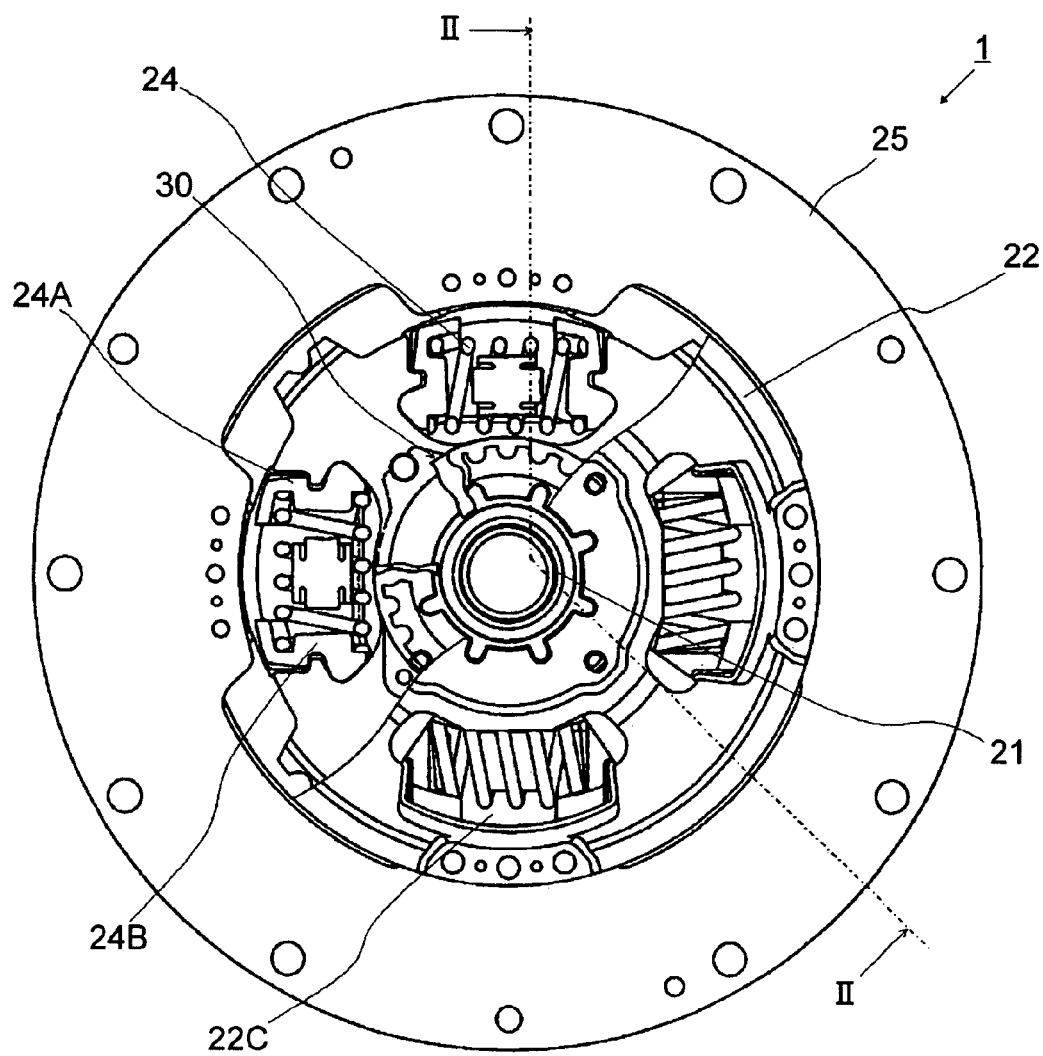
FIG. 1 is a plan view partially cut for illustrating a structure of a torque fluctuation absorber according to an embodiment of the present invention.
Figure 2:
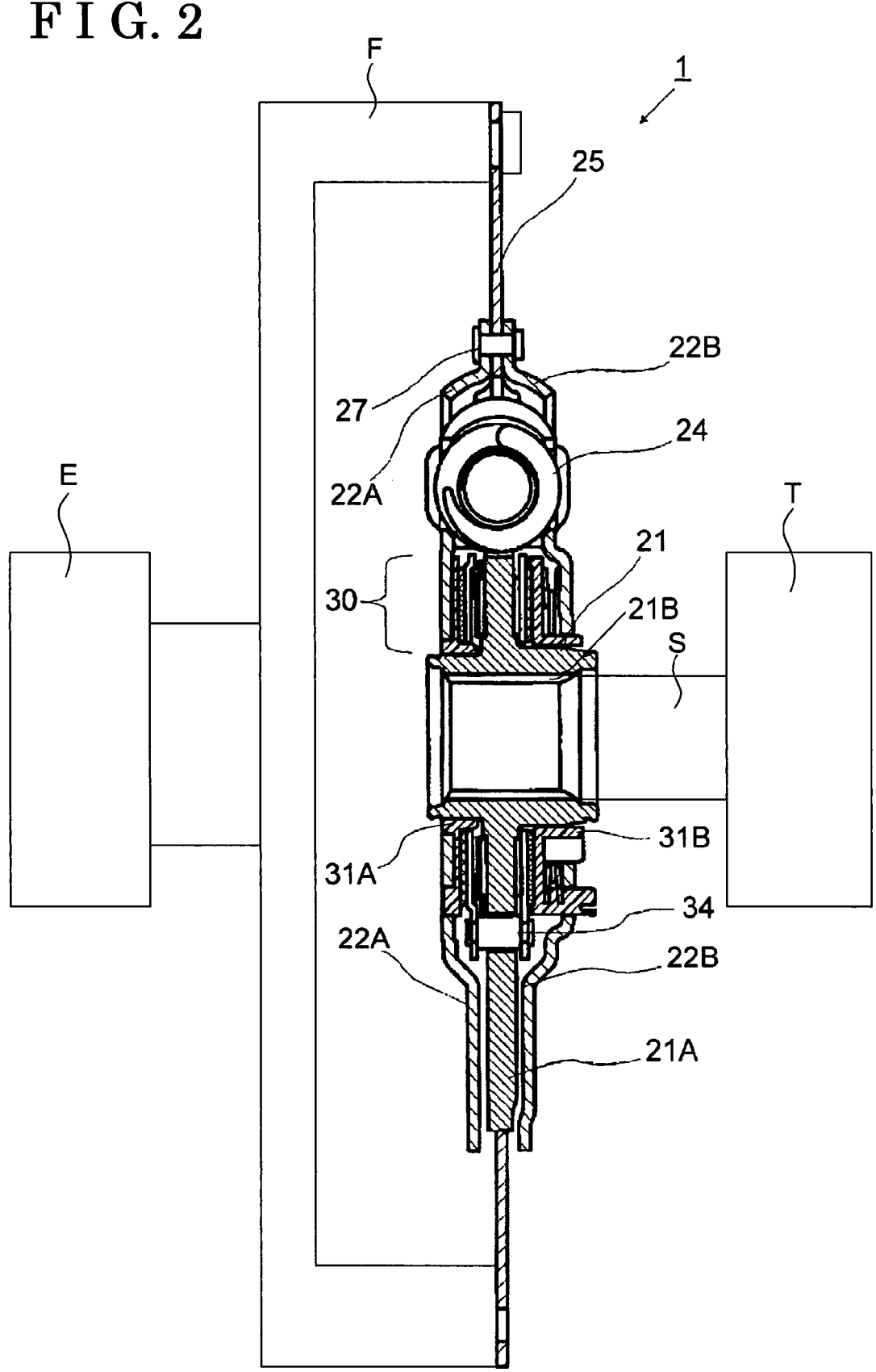
FIG. 2 is a cross-sectional view taken along the line II-II in FIG. 1.

An embodiment of the present invention will be explained with reference to the attached drawings. FIG. 1 is a plan view partially cut for illustrating a structure of a torque fluctuation absorber according to the present embodiment. FIG. 2 is a cross-sectional view taken along the line II-II in FIG. 1. According to the present embodiment, the torque fluctuation absorber is provided between a drive source such as an automobile engine and a transmission.

As illustrated in FIGS. 1 and 2, a torque fluctuation absorber 1 includes a damper mechanism constituted by a hub 21, a side plate 22, a thrust member 30, damper members 24, a disc 25, and a rivet 27 for the purposes of absorbing a driving torque fluctuation input through the disc 25 that is tightened to a flywheel F connected to a drive shaft of a drive source E. The thrust member 30 functions as first and second hysteresis mechanisms (i.e. excess torque restriction mechanism), which will be explained later.

The hub 21 is arranged on a radially inner side of the disc 25 and includes a flange portion 21A radially extending and an inner spline portion 21B. The hub 21 is connected to an outer spline formed at an outer peripheral surface of an input shaft S of a transmission T. The flange portion 21A includes multiple cut portions at a radially outer side where respective damper members 24 are arranged. Each damper member 24 is supported by spring sheets 24A and 24B as illustrated in FIG. 1.

The side plate 22 includes a first side plate 22A and a second side plate 22B. The first side plate 22A and the second side plate 22B include through-holes, respectively, formed at an outer circumferential side and into which the rivet 27 is inserted so as to support the disc 25 as illustrated in FIG. 2. That is, the first side plate 22A and the second side plate 22B are fixed to the disc 25 so as to sandwich the disc 25. The first side plate 22A and the second side plate 22B are coaxially arranged with the hub 21 so as to be rotatable therewith. Further, the first side plate 22A and the second side plate 22B include multiple window portions 22C, respectively, into which the respective damper members 24 are accommodated.

Each damper member 24 is constituted by a coil spring that expands and contracts in response to a fluctuation torque transmitted to the side plate 22 from the disc 25 so as to transmit the torque to the hub 21 through the thrust member 30. The damper members 24 are accommodated in the respective cut portions and the window portions 22C formed in a facing manner at the hub 21 and the side plate 22, respectively.

The disc 25 having a substantially annular shape is arranged on an outer circumferential side of the side plate 22. The disc 25 is sandwiched by the first and second plates 22A and 22B. Further, the disc 25 is fixed to the flywheel F so as to receive the torque from the drive shaft of the drive source E.

The thrust member 30 having a substantially annular shape is disposed between the hub 21 and the side plate 22 and functioning as the hysteresis mechanism.

Figure 3:
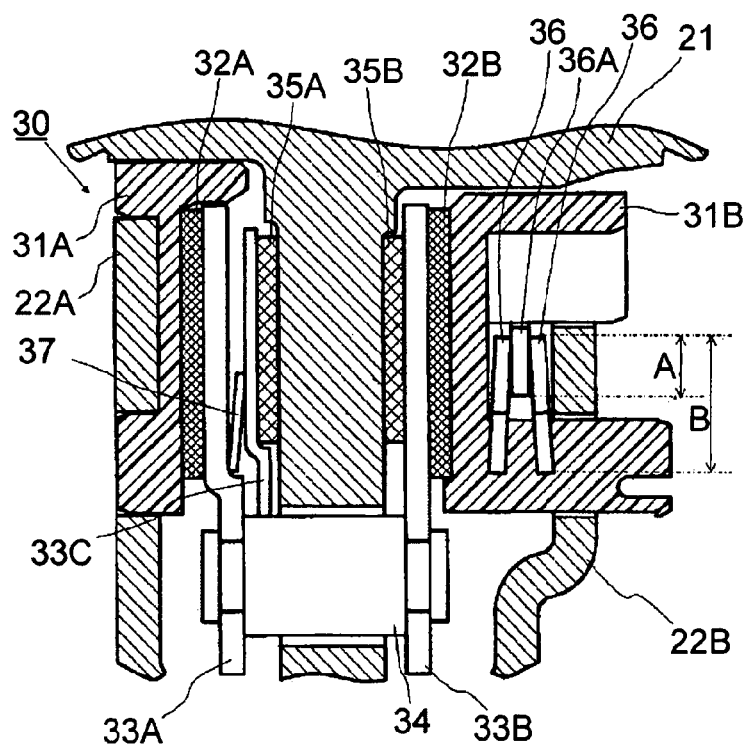
FIG. 3 is an enlarged cross-sectional side view illustrating a detailed structure of a thrust member of the torque fluctuation absorber according to the present invention.
Figure 4:
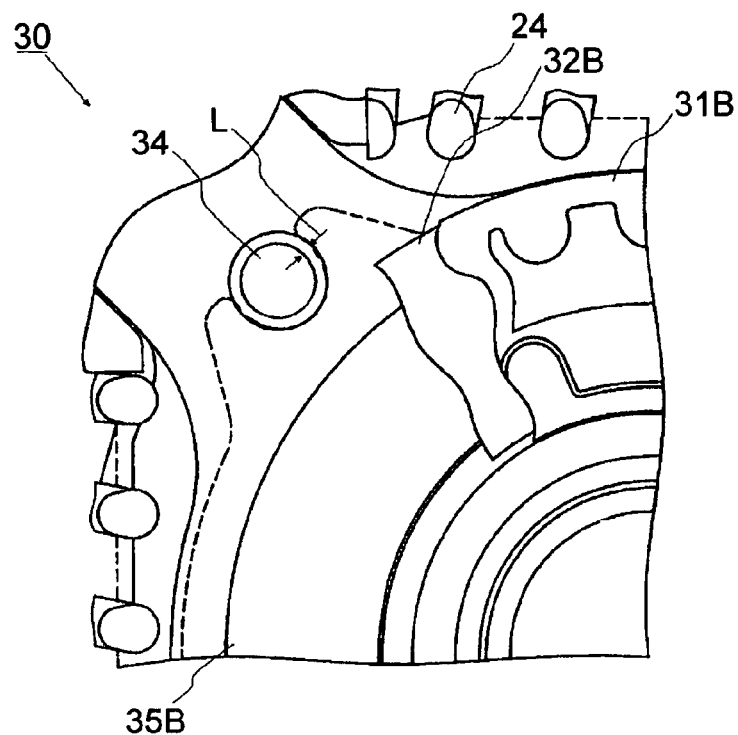
FIG. 4 is an enlarged plan view of the thrust member of the torque fluctuation absorber according to the present invention.

FIG. 3 is an enlarged cross-sectional side view illustrating a detailed structure of the thrust member 30 of the torque fluctuation absorber 1 according to the present embodiment. FIG. 4 is an enlarged plan view of the thrust member 30. As illustrated in FIG. 3, the thrust member 30 includes a first thrust member 31A, a second thrust member 31B, first friction members 32A and 32B each serving as a high friction member, second friction members 35A and 35B each serving as a low friction member, control plates 33A, 33B, and 33C, a stopper pin 34, and disc springs 36 and 37. The first thrust member 31A is arranged on a first side of the flange portion 21A where the first side plate 22A is provided, and the second thrust member 31B is arranged on a second side of the flange portion 21A where the second side plate 22B is provided. The first friction members 32A and 32B make contact with the first and second thrust members 31A and 31B, respectively. The second friction members 35A and 35B make contact with the flange portion 21A of the hub 21. The control plates 33A, 33B, and 33C are arranged among the first friction members 32A and 32B and the second friction members 35A and 35B. Precisely, as illustrated in FIG. 3, the control plates 33A and 33C are arranged between the first friction member 32A and the second friction member 35A, and the control plate 33B is arranged between the first friction member 32B and the second friction member 35B. The stopper pin 34 is provided to maintain a predetermined distance between the control plates 33A and 33B.

The first friction members 32A and 32B (high friction members) are biased by the disc springs 36 so as to frictionally engage with the first and second thrust members 31A and 31B, respectively, thereby generating a large hysteresis (i.e. second hysteresis mechanism). The multiple disc springs 36, arranged in series, can secure a necessary spring load with low-cost materials.

Figure 6A:
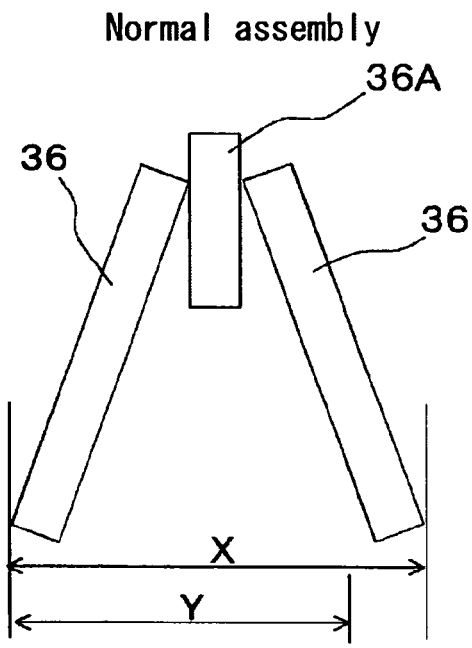
FIGS. 6A and 6B are cross-sectional side views illustrating a detailed structure of disc springs of the torque fluctuation absorber according to the present invention.
Figure 6B:
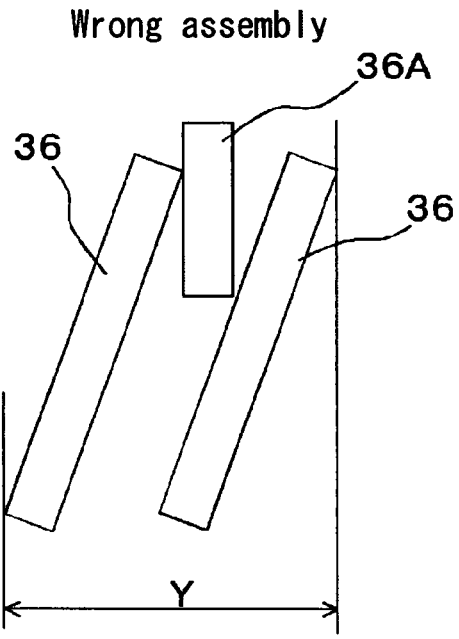

Precisely, as illustrated in FIG. 3, an intermediate plate 36A is disposed between the two disc springs 36. The two disc springs 36 make contact, at respective inner sides, with the intermediate plate 36a. Accordingly, by utilizing an initial deflection of the disc springs 36, a biasing force generated as a whole by the two disc springs 36 can be enhanced. Further, as illustrated in FIG. 3, a width A in a radial direction from a contact point of the intermediate plate 36A with the disc spring 36 to a radially outer end portion of the intermediate plate 36A is defined equal to or smaller than sixty percent of a width B in the radial direction of the disc spring 36. As a result, a height X of the disc springs 36 obtained in the case of a normal assembly thereof as illustrated in FIG. 6A is clearly different from a height Y obtained in the case of a wrong assembly as illustrated in FIG. 6B in which one of the disc springs 36 is assembled in an opposite direction from the correct direction, thereby preventing the disc spring 36 from being assembled in an opposite direction.

The second friction members (low friction members) 35A and 35B are biased by the disc spring 37 arranged between the control plates 33A and 33C so as to frictionally engage with the flange portion 21A of the hub 21. Further, a clearance (i.e. looseness) L as illustrated in FIG. 4 is formed, in a rotational direction of the absorber 1, between the stopper pin 34 and a through-hole, into which the stopper pin 34 is inserted, formed at the flange portion 21A of the hub 21. A coefficient of friction of the second friction members 35A and 35B is smaller than that of the first friction members 32A and 32B. Thus, at the time that a torsion is generated in a circumferential direction of the absorber 1, the small hysteresis is generated by the first hysteresis mechanism before the second hysteresis mechanism generates the large hysteresis when a relative torsion angle (i.e. relative rotational angle) between the control plates 33A and 33C, and the hub 21 is within a range of a predetermined angle corresponding to the clearance L in the rotational direction of the absorber 1, (i.e. first hysteresis mechanism).

The friction members 32A, 32B, 35A and 35B are appropriately formed by concavo-convex surface (i.e. friction surface) patterns, respectively. For example, a radial groove is formed to extend from a radially inner side to a radially outer side of each friction member, thereby improving an ability to discharge abrasion powder, and the like so as to reduce a deterioration with time of the hysteresis function.

In the cases where a ratio of the hysteresis generated by the first hysteresis mechanism (small hysteresis) to that generated by the second hysteresis mechanism (large hysteresis) is defined to be 1.5 or more, for example, the first hysteresis mechanism is activated in a normal state such as a normal driving state of an engine and then the second hysteresis mechanism is activated at a time of turning on or off the engine.

Figure 5:
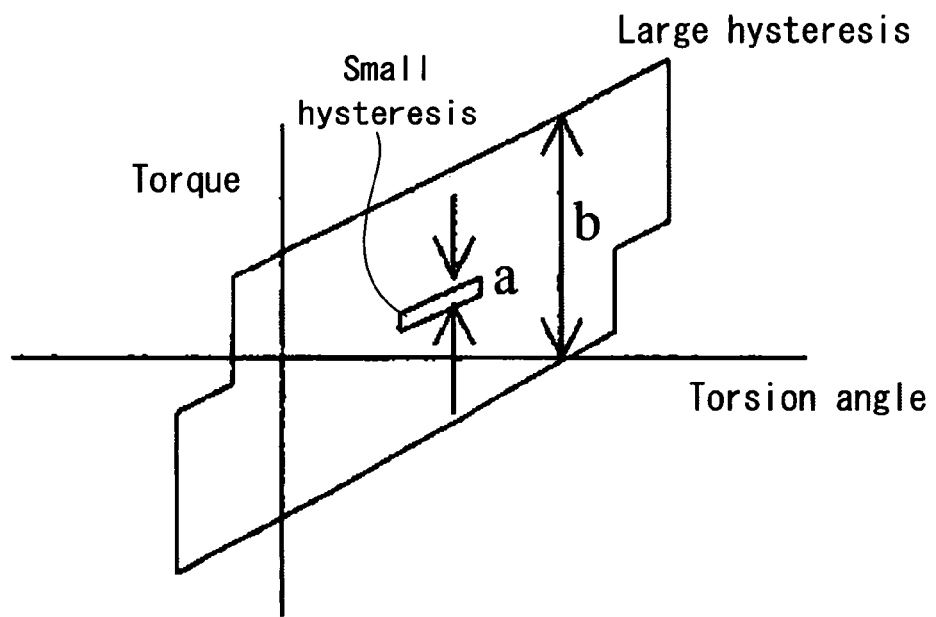
FIG. 5 is a hysteresis characteristic chart for the torque fluctuation absorber according to the present invention.

An operation of the torque fluctuation absorber 1 with the aforementioned structure will be explained with reference to a hysteresis characteristic chart illustrated in FIG. 5. In the case of increased amplitude, a value of the relative torsion angle (i.e. relative rotational angle) between the control plates 33A and 33B and the hub 21 exceeds that of the predetermined angle corresponding to the clearance L in FIG. 4. Thus, the second hysteresis mechanism in addition to the first hysteresis mechanism is activated. At this time, the large hysteresis is generated as shown by "b" in FIG. 5 since the hysteresis by the second hysteresis mechanism is added to the hysteresis by the first hysteresis mechanism. At the time of the engine start, the first friction members 32A and 32B slip to thereby decrease the number of resonant revolutions, which leads to a prevention of the resonance.

On the other hand, at a time of a normal driving of a vehicle, and the like, i.e. the fluctuation torque is within a predetermined value, the relative torsion angle between the control plates 33A and 33B and the hub 21 is within the range of the predetermined angle corresponding to the clearance L in FIG. 4. Thus, only the first hysteresis mechanism is activated. At this time, only the small hysteresis by the first hysteresis mechanism is generated as shown by "a" in FIG. 5.

As mentioned above, according to the aforementioned embodiment, an excessive torque such as the resonance can be prevented by the compact structure at a low-cost. This is because the multi-stage hysteresis function is provided on the inner circumferential side of the damper mechanism so that a limiter mechanism can be eliminated.

Further, according to the aforementioned embodiment, the multiple disc springs 36 are serially arranged to thereby achieve excellent stability and durability as well as a low-cost.

Furthermore, according to the aforementioned embodiment, the two hysteresis mechanisms can damp a low torque vibration and prevent an excessive torque generated upon the engine start, the engine stop, and the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorber comprising:
   a disc fixed to a flywheel to which a driving force is transmitted from a drive source;
   a hub arranged on a radially inner side of the disc and fixed to an input shaft of a transmission;
   first and second side plates fixed to the disc so as to sandwich the disc;
   a damper member accommodated in window portions of the first and second side plates and cut portions of the hub and absorbing torque fluctuations transmitted from the side plates to the hub;
   first and second control plates provided at axial both sides of the hub and arranged between the first and second side plates respectively, the first and second control plates being riveted by a stopper pin;
   a first hysteresis mechanism axially arranged between the first control plate and the hub and between the second control plate and the hub and including first and second low friction members, the first hysteresis mechanism generating a small hysteresis by biasing the first and second low friction members towards one of the control plates and the hub;
   a second hysteresis mechanism axially arranged between the first control plate and the first side plate and between the second control plate and the second side plate and including first and second high friction members, the second hysteresis mechanism generating a large hysteresis greater than the hysteresis generated by the first hysteresis mechanism by biasing the first and second high friction members towards one of the side plates and the control plates; and
   the hub including a flange portion having a through-hole into which the stopper pin is inserted, a relative rotational angle between the control plates and the hub being defined by a clearance formed between the through-hole and the hub in a relative rotational direction of the hub and the control plates, the first hysteresis mechanism being activated when the relative rotational angle is defined within the clearance.

2. A torque fluctuation absorber according to claim 1, wherein a ratio of the small hysteresis to the large hysteresis is equal to or greater than 1.5.

3. A torque fluctuation absorber according to claim 2, wherein each of the first and second high friction members includes predetermined concavo-convex friction surface patterns.

4. A torque fluctuation absorber according to claim 3, wherein the first and second high friction members of the second hysteresis mechanism are biased by plural disc springs serially arranged.

5. A torque fluctuation absorber according to claim 4, further comprising a ring-shaped intermediate plate arranged between the plural disc springs, wherein a width in a radial direction from a contact point of the intermediate plate with each of the plural disc springs to a radially outer portion of the intermediate plate is defined to be equal to or smaller than sixty percent of a width in the radial direction of each of the disc springs.

6. A torque fluctuation absorber according to claim 5, wherein the first and second high friction members are integrally formed with first and second thrust members respectively that engage with the first and second side plates respectively in a rotational direction thereof and that are axially movable, and the plural disc springs are arranged between the thrust members and the side plates.

7. A torque fluctuation absorber according to claim 4, wherein the first and second high friction members are integrally formed with first and second thrust members respectively that engage with the first and second side plates respectively in a rotational direction thereof and that are axially movable, and the plural disc springs are arranged between the thrust members and the side plates.

8. A torque fluctuation absorber according to claim 2, wherein the first and second high friction members of the second hysteresis mechanism are biased by plural disc springs serially arranged.

9. A torque fluctuation absorber according to claim 8, further comprising a ring-shaped intermediate plate arranged between the plural disc springs, wherein a width in a radial direction from a contact point of the intermediate plate with each of the plural disc springs to a radially outer end portion of the intermediate plate is defined to be equal to or smaller than sixty percent of a width in the radial direction of each of the disc springs.

10. A torque fluctuation absorber according to claim 9, wherein the first and second high friction members are integrally formed with first and second thrust members respectively that engage with the first and second side plates respectively in a rotational direction thereof and that are axially movable, and the plural disc springs are arranged between the thrust members and the side plates.

11. A torque fluctuation absorber according to claim 8, wherein the first and second high friction members are integrally formed with first and second thrust members respectively that engage with the first and second side plates respectively in a rotational direction thereof and that are axially movable, and the plural disc springs are arranged between the thrust members and the side plates.

12. A torque fluctuation absorber according to claim 1, wherein each of the first and second high friction members includes predetermined concavo-convex friction surface patterns.

13. A torque fluctuation absorber according to claim 12, wherein the first and second high friction members of the second hysteresis mechanism are biased by plural disc springs serially arranged.

14. A torque fluctuation absorber according to claim 13, further comprising a ring-shaped intermediate plate arranged between the plural disc springs, wherein a width in a radial direction from a contact point of the intermediate plate with each of the plural disc springs to a radially outer end portion of the intermediate plate is defined to be equal to or smaller than sixty percent of a width in the radial direction of each of the disc springs.

15. A torque fluctuation absorber according to claim 14, wherein the first and second high friction members are integrally formed with first and second thrust members respectively that engage with the first and second side plates respectively in a rotational direction thereof and that are axially movable, and the plural disc springs are arranged between the thrust members and the side plates.

16. A torque fluctuation absorber according to claim 13, wherein the first and second high friction members are integrally formed with first and second thrust members respectively that engage with the first and second side plates respectively in a rotational direction thereof and that are axially movable, and the plural disc springs are arranged between the thrust members and the side plates.

17. A torque fluctuation absorber according to claim 1, wherein the first and second high friction members of the second hysteresis mechanism are biased by plural disc springs serially arranged.

18. A torque fluctuation absorber according to claim 17, further comprising a ring-shaped intermediate plate arranged between the plural disc springs, wherein a width in a radial direction from a contact point of the intermediate plate with each of the plural disc springs to a radially outer end portion of the intermediate plate is defined to be equal to or smaller than sixty percent of a width in the radial direction of each of the disc springs.

19. A torque fluctuation absorber according to claim 18, wherein the first and second high friction members are integrally formed with first and second thrust members respectively that engage with the first and second side plates respectively in a rotational direction thereof and that are axially movable, and the plural disc springs are arranged between the thrust members and the side plates.

20. A torque fluctuation absorber according to claim 17, wherein the first and second high friction members are integrally formed with first and second thrust members respectively that engage with the first and second side plates respectively in a rotational direction thereof and that are axially movable, and the plural disc springs are arranged between the thrust members and the side plates.

21. A torque fluctuation absorber comprising:
a disc fixed to a flywheel to which a driving force is transmitted from a drive source;
a hub arranged on a radially inner side of the disc and fixed to an input shaft of a transmission;
a side plate fixed to the disc;
a damper member accommodated in window portions of the first and second side plates and cut portions of the hub along a rotational direction thereof and absorbing torque fluctuations transmitted from the side plates to the hub;
a control plate provided at axial one side of the hub and arranged between the side plate and the hub, the control plate being riveted by a stopper pin;
a first hysteresis mechanism axially arranged between the control plate and the hub and including a low friction member, the first hysteresis mechanism generating a small hysteresis by biasing the low friction member towards one of the control plate and the hub;
a second hysteresis mechanism axially arranged between the control plate and the side plate and including a high friction member, the second hysteresis mechanism generating a large hysteresis greater than the hysteresis generated by the first hysteresis mechanism by biasing the high friction member towards one of the side plate and the control plate; and
the hub including a flange portion having a through-hole into which the stopper pin is inserted, a relative rotational angle between the control plate and the hub being defined by a clearance formed between the through-hole and the hub in a relative rotational direction of the hub and the control plate, the first hysteresis mechanism being activated when the relative rotational angle is defined within the clearance.

* * * * *